June 9, 1964 W. G. PETTIT 3,136,352
TIRE TREAD CUTTING OR GROOVING TOOL
Filed Jan. 4, 1961 3 Sheets-Sheet 1
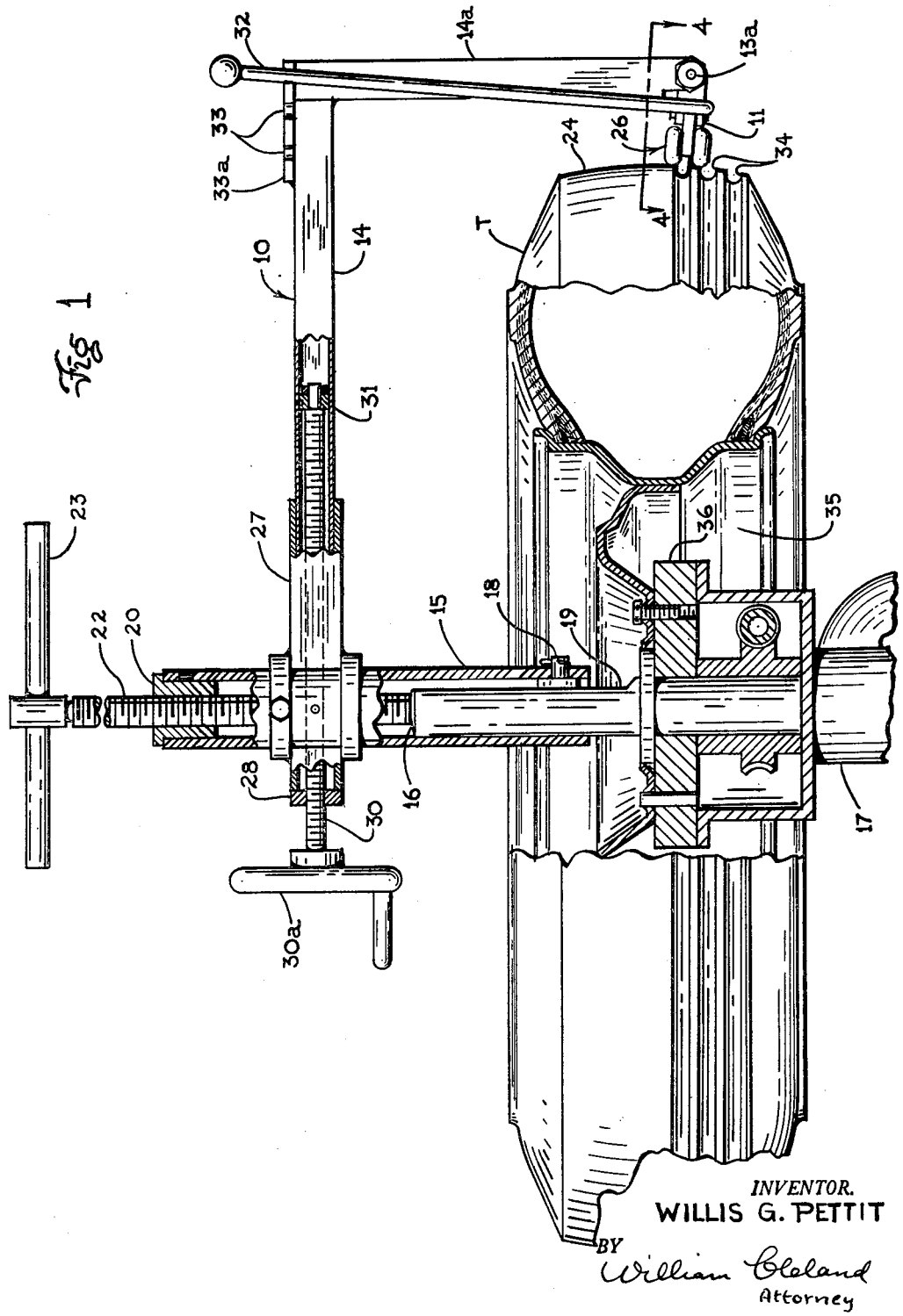
INVENTOR.
WILLIS G. PETTIT
BY
William Cleland
Attorney June 9, 1964 W. G. PETTIT 3,136,352
TIRE TREAD CUTTING OR GROOVING TOOL
Filed Jan. 4, 1961 3 Sheets-Sheet 2
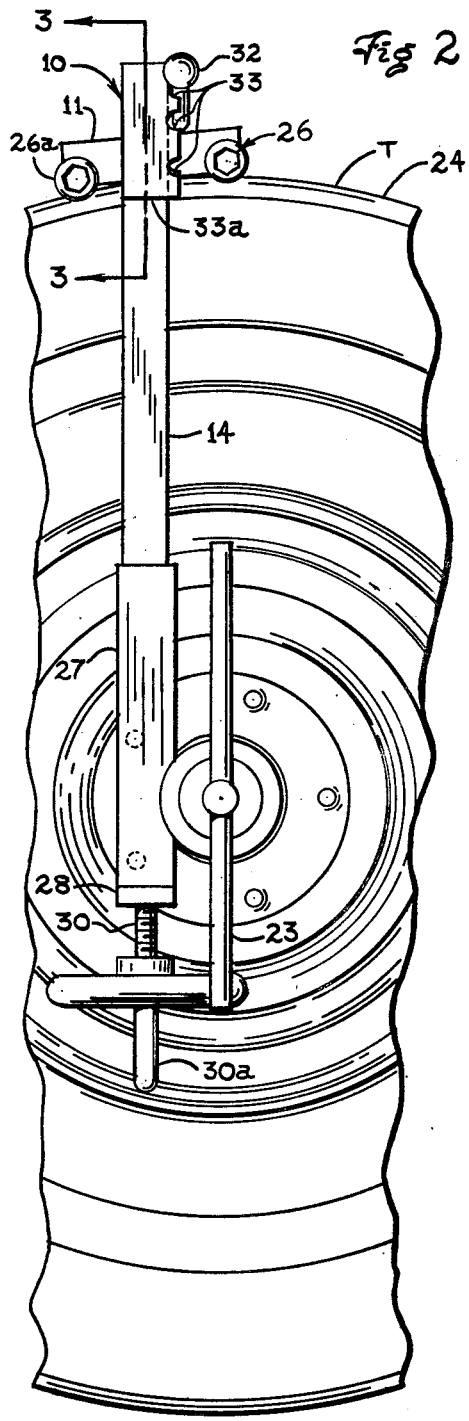
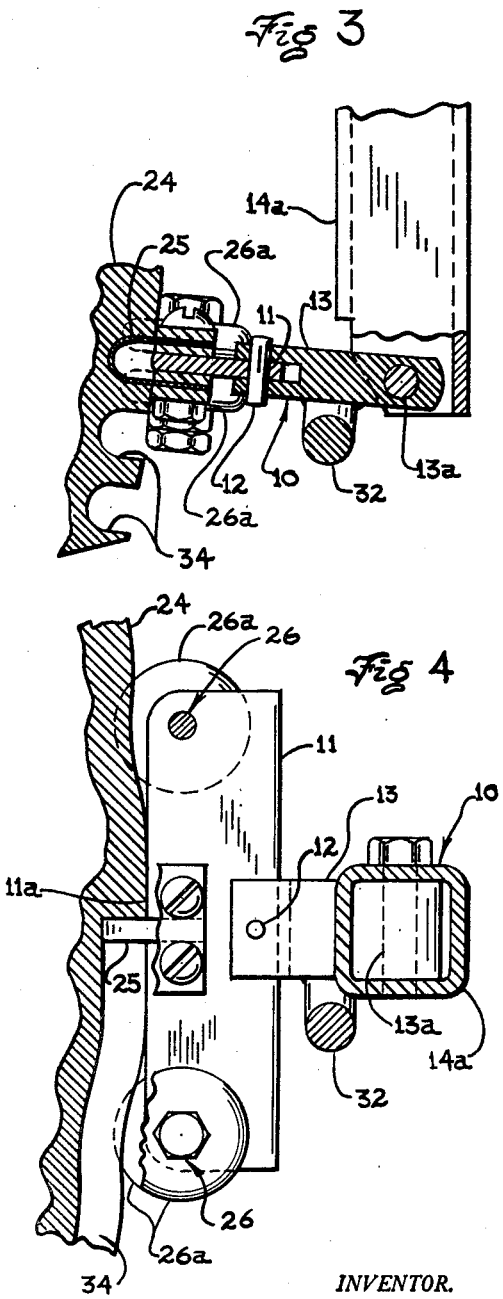
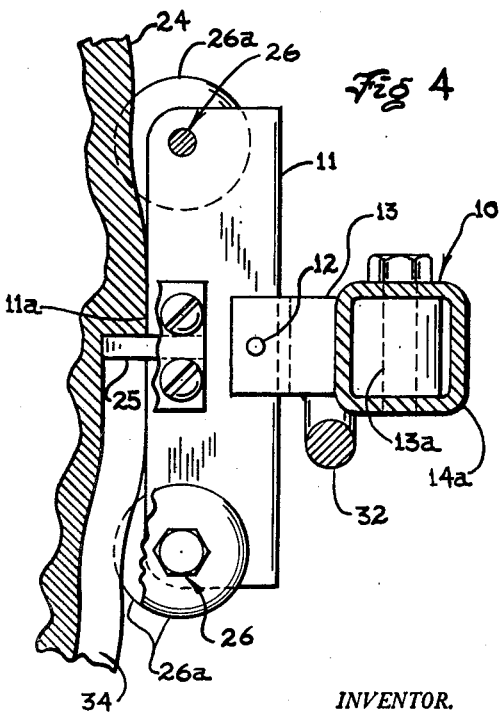
INVENTOR.
WILLIS G. PETTIT
BY
William Cleland

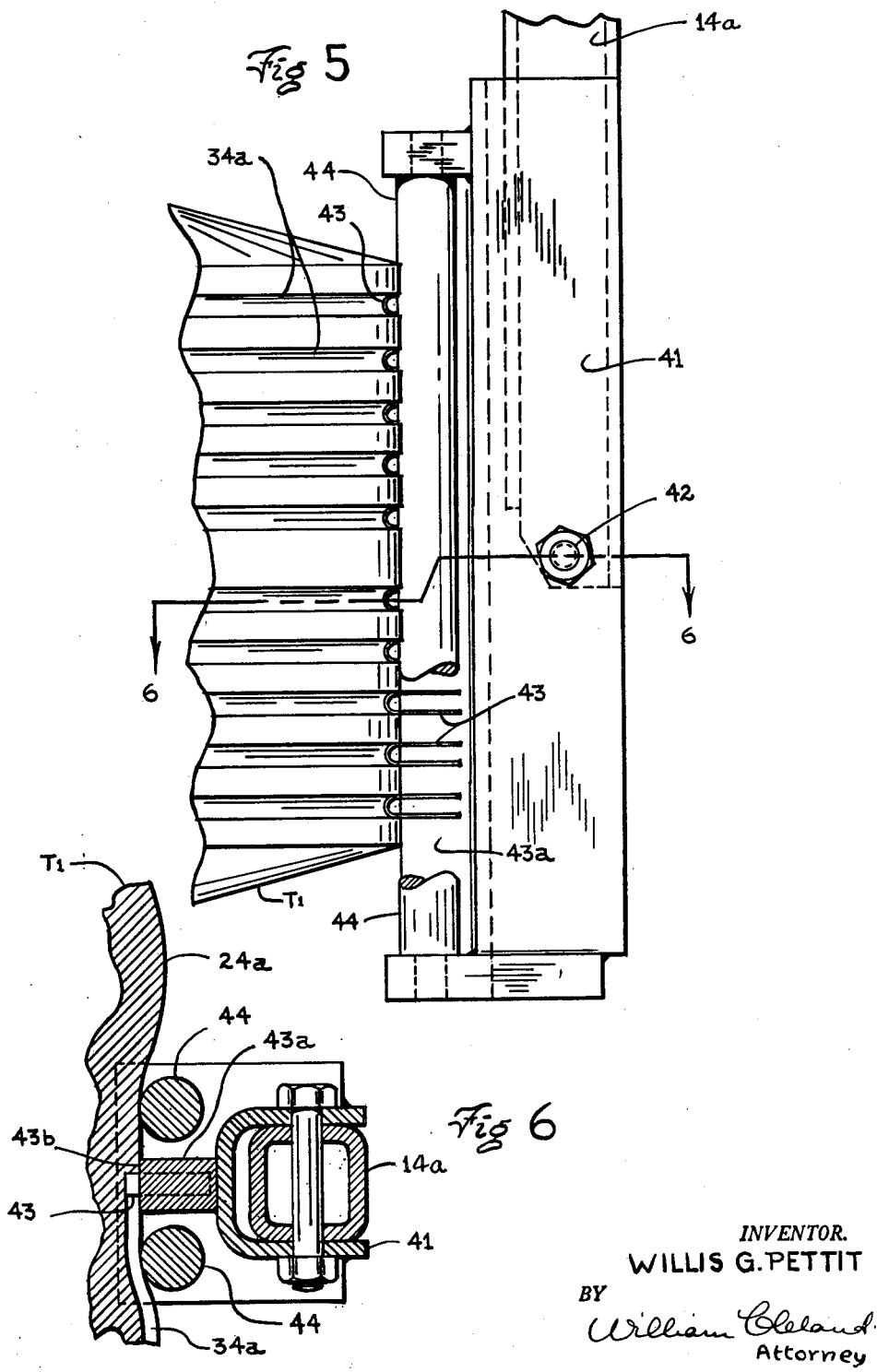

United States Patent Office 3,136,352
Patented June 9, 1964

3,136,352
TIRE TREAD CUTTING OR GROOVING TOOL
Willis G. Pettit, 915 Kenmore Blvd., Akron 14, Ohio
Filed Jan. 4, 1961, Ser. No. 80,604
6 Claims. (Cl. 157—13)

This invention relates to a tire tread cutting tool, and in particular relates to a tool for cutting non-skid grooves in used tires.

One object of the invention is to provide a simple, economical device for cutting non-skid grooves in smooth tread portions of pneumatic tires.

Another object of the invention is to provide a tread cutting tool of the character described which is adapted for ready attachment to existing tire servicing machines having relatively rotatable center posts.

Another object of the invention is to provide an improved tread cutting device having means for maintaining the same in positive relation to the tire tread, to assure cutting non-skid grooves therein to uniform depth peripherally around the tire.

Another object of the invention is to provide a cutting tool of the character described having improved means for cutting a non-skid groove progressively in a continuous spiral around the tire tread.

Another object of the invention is to provide a tool of the character described which is adapted to cut a plurality of spaced non-skid grooves in the tread portion of a tire in a minimum of time.

These and other objects of the invention will be manifest from the following brief description and the accompanying drawings.

Of the accompanying drawings:

FIGURE 1 is a front elevation, partly broken away and in section, illustrating one embodiment of the improved tread cutting tool as used on a conventional tire mounting and demounting machine for providing non-skid grooving in a used tire supported on the machine.

FIGURE 2 is a plan view of FIGURE 1, partly broken away, as viewed from the right thereof.

FIGURE 3 is an enlarged fragmentary view, partly broken away and in section, corresponding to portions of the apparatus shown at the right of FIGURE 1, and substantially as viewed on the line 3—3 of FIGURE 2.

FIGURE 4 is an enlarged horizontal cross-section, taken substantially on the line 4—4 of FIGURE 1.

FIGURE 5 is a view corresponding to FIGURE 3, illustrating a modified form of the invention.

FIGURE 6 is a horizontal cross-section, corresponding to FIGURE 4, and taken substantially on the line 6—6 of FIGURE 5.

Referring particularly to the form of invention shown in FIGURES 1 to 4 of the drawings, the numeral 10 designates generally a tire cutting or grooving tool, including a horizontal cutter support 11 pivoted at 12 on a clevis 13 to swing on a vertical axis, the clevis 13 in turn being swingable about a horizontal axis of a pivot 13a on a downturned extension 14a of a radial arm 14 carried by a socket member 15, non-rotatably received on a power-driven center post 16 of a tire changing machine 17. For non-rotatably, but vertically slidably receiving the socket member 15 on the center post 16, the socket member may have a fixed but removable key 18 slidable against a flat portion 19 on the center post 16. The upper end of the socket member 15 may have a head portion 20 in which is threaded a screw stem 22, the lower end of which is in supporting engagement with the upper end of the center post 16, and thereby adjustably to support the socket member 15 and associated parts. A handle 23 is provided on the upper end of screw stem 22 for manually turning the stem relatively of the head portion 20, thereby to adjust the socket member and related parts axially of the center post 16, and correspondingly to adjust the cutter support 11 transversely of the tire tread portion 24, for purposes to be described later. In practice this vertical or axial movement of the socket member and associated parts is accomplished by manually restraining the handle 23 while the center post rotates the socket member 15.

The cutter means on the cutter support 11 may comprise a loop-shaped blade 25 removably and replaceably affixed to the support intermediate peripherally spaced roller means 26, 26 each comprising a pair of rollers 26a, 26a, and the roller means being adapted to engage the tire tread portion 24 at peripherally spaced points and thereby to engage the cutter blade 25 to predetermined depth within the tread portion (see FIGURE 4). For adjusting the pressure of the roller means 26 against the tire tread, to accomplish firm penetration of the cutter blade 25 into the tread rubber, the arm 14 may be radially slidably, but non-rotatably, received in a sleeve 27 adjustably affixed on the socket member 15 (see FIGURES 1 and 2). Sliding adjustment of the arm may be accomplished by means of a nut 28 non-rotatably mounted on the end of sleeve 27 opposite the arm 14 and threadedly receiving a screw 30 which extends through the sleeve 27 and the arm 14, the inner end of the screw 30 being rotatably affixed in a collar 31 secured to the arm 14. The screw 30 is rotatable with respect to the nut 28, by means of the hand wheel 30a on the outer end of the screw, to adjust arm 14 axially with respect to the post 16 to vary the pressure of the roller means 26 against a tire tread portion 24.

The cutter support 11 may be angularly adjusted with clevis 13, about pivot 12, to accommodate the cutter means to the transverse curvature of the tire tread 24 (see FIGURE 3). To this end, a handle 32 is affixed to the pivoted clevis 13. Various said angular positions of the support 11 may be maintained by releasable engagement of the upper portion of handle 32 with radially spaced indexing notches 33, 33 in the edge of the plate 33a, affixed on the upper side of the radial arm 14.

In use of the tread cutting tool 10 for providing tread grooves or grooving 34, 34 it is mounted as previously described, with the socket member 15 non-rotatably received on the power-driven center post 16 of a tire mounting machine 17. For this purpise a vehicle wheel 35, on which a tire T is mounted in inflated condition, is secured to a relatively fixed horizontal table 36 of the machine by any suitable means, so that the driven post 16 carrying the arm 14 will be rotated with respect to the tire. Before the post is driven, however, the screw shaft 22 is manually adjusted to set the roller means 26 against the lower portion of the tire tread 24 as viewed in FIGURE 1, and the hand wheel 30a is turned to adjust the screw 30 in the nut 28, and thereby to urge the arm 14 radially inwardly to apply requisite pressure of the roller means 26 against the tread portions, substantially as shown in FIGURES 2 and 4. At the same time the angle of the cutting blade is adjusted to the transverse curvature of the tread portion by engaging the handle 32 with the outermost indexing notch 33.

For safety purposes, namely to prevent injury in case of accidential blowout of the tire, it is desirable to inflate the same at a relatively low pressure, such as eight to ten pounds per square inch for passenger tires. Accordingly, the aforesaid engagement of the tire tread by the roller means 26 will depress the tread portions to a certain extent at circumferentially spaced points and the portion of the tread intermediate the roller means will tend to be outwardly distorted or expanded into firm engagement with the central portion 11a of the holder 11 surrounding the blade (see FIGURES 3 and 4). This assures positive engagement of the blade 25 to constant uniform depth during continued grooving operations to be described. In addition, the resultant friction maintains the blade sufficiently hot to assist the cutting action of the same through tread rubber.

Now, the machine 17 may be operated to drive the center post 16 through the sliding key 18 to revolve the socket member 15 and arm 14, whereby the cutter blade 25 will cut a non-skid groove 34 peripherally around the tire tread. With continued rotation of the arm 14, while the operator restrains the handle 23 to prevent rotation of the screw 22 with respect to rotating socket member 15, which causes the socket member 15 to move progressively upwardly on the same, the cutter blade 25 will cut groove 34 in a spiral around the tire tread portion 24, until the cutter blade reaches adjacency with the upper edge or shoulder of the tread portion. In the meantime, as this cutting action progresses, the operator may adjust the angle of the cutter blade to suit the curvature of the tread portion 24, by moving arm 32 to corresponding positions of engagement with the other indexing notches 33. Upon completion of the spiral grooving 34, rotation of the center post is stopped and the cutter blade is released from engagement with the tire tread through operation of the hand wheel 30a, and the tool 10 is lifted from the center post 16. The wheel and tire assembly is then removed from the machine 17 in known manner.

Referring to the modification of the invention shown in FIGURES 5 and 6, a cutter support 41 of channel cross-section is pivoted at 42 to the downward extension 14a of the arm 14. Mounted on a cutter bar 43a of the cutter support 41 may be a plurality of transversely spaced loop-shaped cutter blades 43, 43, intermediate circumferentially spaced, elongated rollers 44, 44 on said support. These rollers may be mounted to be rotatable on axes extending transversely of the tread portion 24a of the tire T', and are adapted progressively to engage and flatten the tread portion in the area between the two rollers, toward firm engagement with the inwardly presented face 43b, of cutter bar 43a, the arm 14 swings about the center post 16, all of the cutter blades 43 will cut separate continuous grooves 34a to the full depths of the blades. As before, the pressure of the rollers 44 against the tire tread is adjustable by turning the hand wheel 30a and screw 30 to move the arm 14.

Use of the structure shown in FIGURES 5 and 6 is otherwise substantially the same as described in connection with FIGURES 1 and 4, except that the handle 23 (FIGURE 1) is not restrained, and the supporting screw 22 is against rotation with the center post 16, as previously described in connection with FIGURES 1 to 4, although the screw 22 is initially adjusted to center the support 41 with respect to the tread portion 24a (see FIGURE 5). Accordingly, upon rotation of the arm 14 with the driven center post 16, the cutter blades 43 simultaneously will cut a series of separate parallel grooves of predetermined depths. In this regard the spacing and shapes of the cutter blades 43 may be varied considerably to cut grooves of correspondingly varied spacings, shapes and depths as required for different purposes.

The tread cutting tools described above are particularly useful for increasing the useful life of used penumatic tires on which the tread portions have been worn smooth but which still have substantial thickness of tread rubber. The tread-cutting operations described are designed to enhance the appearance of such used tires, in addition to increasing the non-skid properties of the same.

Further modifications of the invention may be resorted to without departing from the spirit thereof, or the scope of the appended claims.

What is claimed is:

1. A tool for making non-skid cuts peripherally around the tread portion of an inflated pneumatic tire fixedly mounted on a tire mounting table having an upstanding center post rotatably receiving said center post to support the socket member thereon; said socket member having an arm thereon adapted to extend radially of a central vertical axis of the socket member mounted on said center post; a cutter support carried by said arm and having spaced roller means for engagement with circumferentially spaced portions of the tire tread; said cutter support having a radially inwardly presented tread-engaging stop portion intermediate said roller means; cutter means affixed on said cutter support to project radially of said center post and inwardly beyond said stop portion a predetermined extent; and adjustable means for urging said cutter support radially inwardly of said socket member for yieldingly depressing said spaced roller means into the tire tread, and thereby to expand the tread portions intermediate the tread portions depressed by roller means radially outwardly into frictional engagement with said stop portion, and thereby continuously to maintain said projecting cutter means in constant uniform cutting depth within tire tread as said arm is rotated relatively of the tire; variable means being provided on said socket member to vary the support of the same axially on said center post, and correspondingly to vary the cutting position of said cutter means transversely of the tire tread portion; said variable means including a stem adjustably threaded in said socket member to have an inner end of the stem rotatably but non-threadedly supported on the upper end of the center post, said stem having means for relatively restraining rotation thereof with respect to said socket member upon rotation of the same with the center post, and thereby to effect axial adjustment of the socket member on said center post.

2. A tool as set forth in claim 1, said adjustable means including a screw-actuated telescopic connection between said arm and said socket member.

3. A tool as set forth in claim 1, said arm having a downturned extension and an element pivoted thereon to swing substantially in a vertical plane about a horizontal axis, said cutter support being pivoted on said element to swing about a vertical axis and in a horizontal plane, and means being provided for adjusting said element on said arm extension to adjust said element thereon to accommodate the angle of the cutter support to the transverse curvature of the tire tread, said cutter support being self-adjusting on its pivotal connection to said element for maintaining said spaced roller means in engagement with the tire tread.

4. A tool as set forth in claim 3, wherein said spaced roller means engage transversely of the tire tread and said cutter means includes a plurality of transversely spaced cutting blades of loop-shaped cross-section for cutting a plurality of tire tread portions to predetermined depths.

5. A tool as set forth in claim 1, said arm having a downturned extension and an element pivoted thereon to swing substantially in a vertical plane about a horizontal axis, said cutter support being pivoted on said element to swing about a vertical axis and in a general plane of the cutter support passing centrally through said spaced roller means and cutter means, and means being provided for adjusting said element on said arm extension to adjust said element thereon to accommodate the angle of the cutter support to the transverse curvature of the tire tread, said cutter support being self-adjusting on its pivotal connection to said element for maintaining said spaced roller means in engagement with the tire tread.

6. A tool for making non-skid cuts peripherally around the tread portion of an inflated pneumatic tire fixedly mounted on a tire mounting table having an upstanding center post, comprising: a socket member for receiving said center post to support said socket member thereon; said socket member having an arm thereon adapted to extend radially of a central vertical axis of the socket member mounted on said center post; a cutter support carried by said arm and having spaced roller means for engagement with circumferentially spaced portions of the tire tread; cutter means affixed on said cutter support to extend radially inwardly of the same; adjustable means for urging said cutter support radially inwardly of said socket member for yieldingly depressing said spaced roller means into the tire tread; said arm having a down-turned extension having an element pivoted thereon to swing substantially in a vertical plane, said cutter support being pivoted on said element to swing generally in a horizontal plane, and means being provided for adjusting said element on said arm extension to adjust said element thereon to accommodate the angle of said plane of the cutter support to the transverse curvature of the tire tread, said cutter support thereby being self-adjusting on its pivotal connection to said element for maintaining said spaced roller means in engagement with the tire tread.

References Cited in the file of this patent

UNITED STATES PATENTS

| | | |
|---|---|---|
| 1,971,582 | Scruby | Aug. 28, 1934 |
| 2,075,421 | Bennett | Mar. 30, 1937 |
| 2,165,842 | Eger | July 11, 1939 |
| 2,269,137 | Wikle | Jan. 6, 1942 |
| 2,333,599 | Terry | Nov. 2, 1943 |
| 2,603,290 | Lindemann | July 15, 1952 |
| 2,695,659 | Athmann | Nov. 30, 1954 |